United States Patent
Worsley et al.

(10) Patent No.: US 10,464,015 B2
(45) Date of Patent: Nov. 5, 2019

(54) MOLTEN HYDROXIDE MEMBRANE FOR SEPARATION OF ACID GASES FROM EMISSIONS

(71) Applicant: Lawrence Livermore National Security, LLC, Livermore, CA (US)

(72) Inventors: Marcus Worsley, Hayward, CA (US); Patrick Campbell, Oakland, CA (US); Sangil Kim, Pleasanton, CA (US); Matthew Merrill, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 547 days.

(21) Appl. No.: 15/159,681

(22) Filed: May 19, 2016

(65) Prior Publication Data

US 2017/0333834 A1    Nov. 23, 2017

(51) Int. Cl.
B01D 69/10 (2006.01)
B01D 53/22 (2006.01)
(Continued)

(52) U.S. Cl.
CPC ........... *B01D 53/228* (2013.01); *B01D 53/40* (2013.01); *B01D 53/508* (2013.01); *B01D 53/565* (2013.01); *B01D 53/62* (2013.01); *B01D 53/82* (2013.01); *B01D 61/38* (2013.01); *B01D 69/10* (2013.01); *B01D 69/12* (2013.01); *B01D 71/02* (2013.01); *B01D 69/02* (2013.01); *B01D 71/022* (2013.01); *B01D 71/024* (2013.01); *B01D 2053/221* (2013.01); *B01D 2251/306* (2013.01); *B01D 2251/604* (2013.01); *B01D 2257/302* (2013.01); *B01D 2257/404* (2013.01); *B01D 2257/50* (2013.01); *B01D 2257/504* (2013.01); *B01D 2258/0283* (2013.01); *B01D 2311/13* (2013.01); *B01D 2325/02* (2013.01);
(Continued)

(58) Field of Classification Search
None
See application file for complete search history.

(56) References Cited

U.S. PATENT DOCUMENTS

| 5,562,754 A | 10/1996 | Kang et al. |
| 6,080,281 A | 6/2000 | Attia |

(Continued)

FOREIGN PATENT DOCUMENTS

| WO | 2006113674 A2 | 10/2006 |
| WO | 2008113061 A1 | 9/2008 |

(Continued)

OTHER PUBLICATIONS

Anderson et al., "Carbonate-ceramic dual-phase membrane for carbon dioxide separation," Journal of Membrane Science, vol. 357, Apr. 2010, pp. 122-129.

(Continued)

*Primary Examiner* — Anita Nassiri-Motlagh
(74) *Attorney, Agent, or Firm* — Zilka-Kotab

(57) ABSTRACT

In one embodiment, a separation membrane includes: a porous support structure; and at least one alkali metal hydroxide disposed within pores of the porous support structure. In another embodiment, a method for separating acidic gases from a gas mixture includes exposing the gas mixture to a separation membrane at an elevated temperature, where the separation membrane includes a porous support and at least one molten alkali metal hydroxide disposed within pores of the porous support.

19 Claims, 3 Drawing Sheets

(51) Int. Cl.
*B01D 53/40* (2006.01)
*B01D 53/50* (2006.01)
*B01D 53/56* (2006.01)
*B01D 53/62* (2006.01)
*B01D 53/82* (2006.01)
*B01D 69/12* (2006.01)
*B01D 71/02* (2006.01)
*B01D 61/38* (2006.01)
*B01D 69/02* (2006.01)

(52) U.S. Cl.
CPC ...... *B01D 2325/04* (2013.01); *B01D 2325/26* (2013.01); *Y02C 10/10* (2013.01)

(56) References Cited

U.S. PATENT DOCUMENTS

2013/0236726 A1 9/2013 Kwon et al.
2016/0059181 A1 3/2016 Kim et al.

FOREIGN PATENT DOCUMENTS

WO 2009067090 A1 5/2009
WO 2010132863 A1 11/2010

OTHER PUBLICATIONS

Yin et al., "Capture and electrochemical conversion of CO2 to value-added carbon and oxygen by molten salt electrolysis," Energy & Environmental Science, vol. 6, 2013, pp. 1538-1545.

Xing et al., "Steam-promoted CO2 flux in dual-phase CO2 separation membranes," Journal of Membrane Science, vol. 482, Mar. 2015, pp. 115-119.

Rui et al., "Ionic conducting ceramic and carbonate dual phase membranes for carbon dioxide separation," Journal of Membrane Science, vol. 417-418, Jun. 2012, pp. 174-182.

International Search Report and Written Opinion from PCT Application No. PCT/US2017/031155, dated Jul. 21, 2017.

MOLTEN HYDROXIDE MEMBRANE FOR SEPARATION OF ACID GASES FROM EMISSIONS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The presently disclosed inventive concepts relate to carbon capture and separation (CCS), and more particularly to dual-phase separation membranes for post-combustion carbon capture and separation.

BACKGROUND

Greenhouse gas emissions, and particularly carbon dioxide emissions, are an increasing concern in the context of environmental health and as a contributor to global climate change. As such, much effort is currently spent developing ways to reduce or eliminate carbon dioxide emissions from important modern processes, particularly industrial processes.

A well-known and predominant source of carbon dioxide emissions in the modern industrial economy arises from power production. Accordingly, this sector has been the focus of efforts to reduce or eliminate carbon dioxide emissions. One typical approach to accomplish this objective is the use of a separation membrane or amine-based separation solution to capture carbon dioxide after combustion but prior to releasing exhaust into the atmosphere. Some solutions instead attempt to capture carbon dioxide pre-combustion, but have met with limited success, and are associated with prohibitively high costs due to the need to integrate legacy systems with complex fuel-conversion processes.

Focusing now on post-combustion capture techniques, many conventional separation systems employ a solid phase membrane, such as a polymer or ceramic; a solution of organic amines (e.g. monoethanolarnine, or MEA) solvated in water; or a dual phase molten carbonate/ceramic membrane to accomplish separation of carbon dioxide.

Typical polymer-based membrane separation systems generally separate gases through size effects or chemical effects. Size exclusion membranes effectively separate carbon dioxide from hydrocarbons but have prohibitively low selectivity for separating carbon dioxide from other gases, such as molecular nitrogen, as needed for the remediation of flue gases common in the targeted application to industrial sources of greenhouse gas emissions. Chemical exclusion membranes separate carbon dioxide from molecular nitrogen with high selectivity, but at prohibitively slow rates. Polymer membranes are also troubled by limited temperature ranges <250 C) and are prone to fouling by gases (e.g. sulfur and nitrogen oxides) and/or particulate matter in the flue gas.

Conventional oxygen separation membranes employ solid-phase ceramic separation systems which separate molecular oxygen from molecular nitrogen before combustion, instead of separating carbon dioxide from molecular nitrogen after combustion. These membranes require operation at temperatures of 800-1000 C, which is much higher than the 300-700 C temperature range at which targeted sources of greenhouse gas emissions operate, the temperature at which flue gas exits the combustion chamber (prior to the heat exchanger). Preheating air to this high temperature range for removing the 20% fraction of molecular oxygen is energetically expensive, and reduces the efficiency of the power production capability of the emission source. This system is also reactively slow ($1\times10^{-11}$ to $1\times10^{-8}$ mol $s^{-1}$ $cm^{-2}$ in the 800-1000 C range) because the oxygen must transition through the solid phase as oxide ($O^{2-}$) ions.

Traditional liquid phase treatment, such as amine gas treatment involves using an organic amine in a water solvent to capture cold (<80 C) carbon dioxide in an absorber from the flue gas of the emission source, e.g. a fossil fuel power plant. The carbon dioxide is later released in a regenerator with the application of heat energy. This system consumes 25-40% of the power plant's energy through exchanged and consumed heat energy. The infrastructure costs for an absorber, regenerator, etc., are also substantial. Together, the energy and infrastructure costs for this system are expected to double the cost of electricity produced by emission source. Unfortunately, the use of other materials for carbon dioxide adsorption does not significantly change the energy or infrastructure costs.

Existing dual phase separation membranes, such as carbonate-ceramic membranes, separate carbon dioxide from molecular nitrogen using both a molten (liquid) carbonate phase and a solid ceramic phase. The solid ceramic phase serves both as a porous, solid structural support for the molten carbonate phase as well as an oxide ion conductor via the same conduction process involved with oxygen separation membranes. The molten carbonate phase transports carbon dioxide across the membrane as carbonate ions ($CO_3^{2-}$), while oxide conduction in the opposite direction to carbonate conduction is required to maintain oxygen and charge balance. The conduction of $O^{2-}$ through the solid phase is much slower than the relatively fast conduction of carbonate through the liquid phase and so the whole system is rate-limited by the slow rate of oxide conduction.

While mixtures or eutectics of lithium, sodium, and potassium carbonate can reach melting temperatures as low as 400-500 C and can conduct carbonate ions in this temperature range, this system nonetheless requires much higher operational temperatures because of the additional requirement for oxide conduction. Similar to oxygen separation membranes, the application of the carbonate-ceramic dual phase separation membrane is limited to very high temperatures (>700 C) due to the substantial thermal energy required to move oxide ions through the solid phase. The concurrent problems with a dependence upon oxide conduction through a solid phase render the separation process prohibitively slow and requires operation temperatures which are too high for effective separation of carbon dioxide from hot flue gas.

Accordingly, it would be beneficial to provide systems and techniques for separating carbon dioxide gas from emissions sources such as flue pas of fossil fuel power plants that are capable of operating at the ambient temperature of the flue gas as emitted from the source with a sufficient reaction rate to effectively separate the carbon dioxide without consuming substantial power from the source and without associated infrastructure costs incurred by the existing techniques and systems described above.

SUMMARY

In one embodiment, a separation membrane includes: a porous support structure; and at least one alkali metal hydroxide disposed within pores of the porous support structure.

In another embodiment, a method for separating acidic gases from a gas mixture includes exposing the gas mixture to a separation membrane at an elevated temperature, where the separation membrane includes a porous support and at least one molten alkali metal hydroxide disposed within pores of the porous support.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a filler understanding of the nature and advantages of the present invention, reference should be made to the following detailed description read in conjunction with the accompanying drawings.

DETAILED DESCRIPTION

Figure 1A:
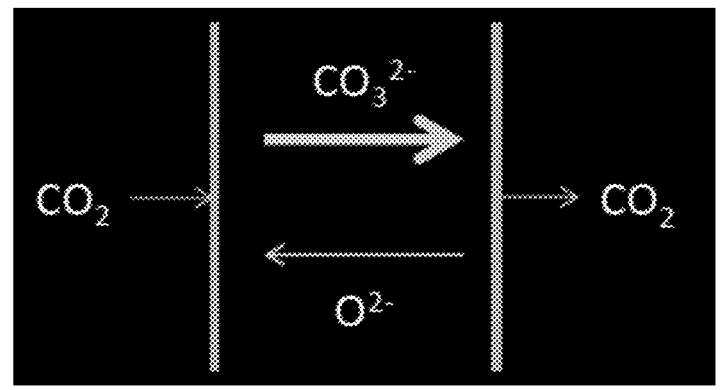
FIG. 1A depicts a separation mechanism based for molten carbonate separation membranes, according to conventional approaches.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

As also used herein, the term "about" when combined with a value refers to plus and minus 10% of the reference value. For example, a length of about 1 μm refers to a length of 1 μm±0.1 μm.

It must also be noted that, as used in the specification and the appended claims, the singular forms "a," "an" and "the" include plural referents unless otherwise specified.

The following description discloses several preferred embodiments of three dimensional porous separation membranes and/or related systems and methods of making the same.

In one general embodiment, a separation membrane includes: a porous support structure; and at least one alkali metal hydroxide disposed within pores of the porous support structure.

In another general embodiment, a method for separating acidic gases from a gas mixture includes exposing the gas mixture to a separation membrane at an elevated temperature, where the separation membrane includes a porous support and at least one molten alkali metal hydroxide disposed within pores of the porous support.

In a conventional power plant (and various other types of internal combustion engines), exhaust from combustion of fuels typically includes greenhouse gases, such as $CO_x$, and offensive acid gases such as $NO_x$, and $SO_x$. The exhaust gases are exist at temperature, e.g. in a range from 300-700 C, and may be utilized to perform thermal work, e.g. by converting water to steam for harvesting energy from the combustion reaction.

There is a need for more efficient and less expensive carbon dioxide separation technology for carbon capture and sequestration (CCS). The presently disclosed inventive concepts provide a carbon dioxide separation membrane which is so energy and cost efficient that it outcompetes other technologies and is economically implementable. The inventive systems and techniques leverage reversible carbon dioxide solubility in molten hydroxide, e.g. potassium, sodium, and/or lithium hydroxide (KOH, NaOH, LiOH) electrolytes.

Interestingly, the proposed mechanism counters conventional expectations that molten hydroxide electrolytes will completely and irreversibly convert to the solid phase carbonate according to the reaction shown in equation (1), below. Instead, at temperatures above 250 C., the reaction is actually reversible as shown in equation (2).

$$2KOH + CO_2 \rightarrow K_2CO_3 + H_2O \quad \text{(Equation 1)}$$

$$2KOH + CO_2 \leftrightarrows K_2CO_3 + H_2O \quad \text{(Equation 2)}$$

Reaction (1) becomes reversible in the molten system (e.g. >30 M potassium hydroxide) at elevated temperatures (e.g. >250° C.) as long as sufficient water is present in the system. The presence of water shifts the equilibrium of reaction (1) to the left. Molten potassium hydroxide retains molar concentrations of water up to 400-600° C., depending on steam pressure. Advantageously, water is a combustion byproduct which occurs in concentrations similar to carbon dioxide in flue gases at sufficient amounts to maintain the reversibility of the reaction as shown in equation (2).

Acid/base chemistry separates acid gases from non-acid gases. The molten hydroxide system absorbs carbon dioxide, nitrogen dioxide, and sulfur dioxide acid gases by forming $CO_3^{2-}$, $NO_3^{-}$, and $SO_4^{2-}$, respectively, with molar solubilities. The solubility of the acid gases and the relative insolubility of molecular nitrogen, oxygen and hydrogen gases means the membrane can selectively remove the greenhouse gases from the flue gas.

A pressure gradient may be utilized for pulling solvated gases through a membrane. The removal of the dissolved gases from one side of the membrane causes a concentration gradient which moves the gases from high pressure (the flue gas side) to low pressure (acid gas removal side) through diffusion. The rate of acid gas transport across the membrane is a function of solubility, diffusion coefficients, membrane thickness, and pressure gradient.

As noted above, existing techniques for carbon capture function by using either low-efficiency separation membranes (e.g. molten carbonate.) or an amine-based solution to separate carbon dioxide from exhaust. These techniques are limited by the rate of oxide transport through solid phase (in the case of molten carbonate membranes) and/or consume significant energy to accomplish separation. The presently disclosed inventive concepts overcome these limitations, and offer a broader range of applicability, through the use of molten hydroxide to facilitate capture and separation of acidic gases.

Figure 1B:
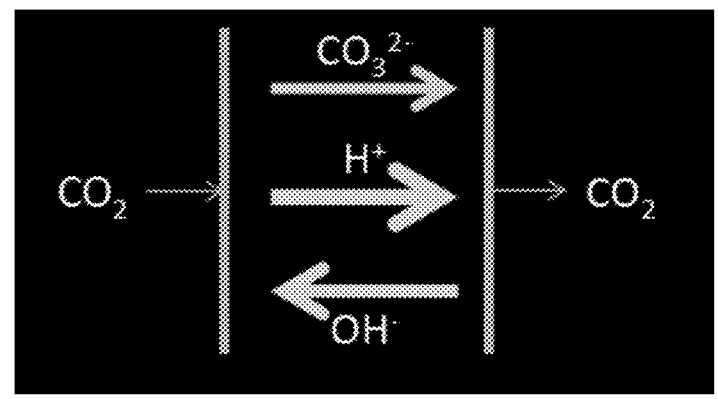
FIG. 1B depicts a separation mechanism based for molten hydroxide separation membranes, according to one embodiment of the presently disclosed inventive concepts.

Mechanistically, the differences between previous separation membrane function and the presently disclosed hydroxide-based separation are shown in FIGS. 1A-1B, respectively.

The known mechanism shown in FIG. 1A involves selective capture of carbon dioxide at an inlet of the separation membrane (left side of FIG. 1A) and si subsequent conversion to a carbonate ion for transport through the molten carbonate phase of the membrane and ultimate release from an outlet of the membrane (right side of FIG. 1A). To balance the equilibrium of this exchange, oxide ions are transported in the opposite direction. As noted above, the oxide ion travels through the solid phase of the membrane, and is thus a rate-limiting factor in the separation process. In addition, this solid phase oxide transport requires very high operating temperatures, e.g. above 700 C, which undesirably limits the applicability and efficiency of the separation process.

Accordingly, a new mechanism is proposed in FIG. 1B, based on discovery that carbon dioxide and other similar acidic gases are reversibly soluble in a molten hydroxide phase. In operation, the carbon dioxide (or other acidic gas as described herein) is introduced to the separation membrane at the inlet (left side of FIG. 1B) and converted to a carbonate for transport through the molten hydroxide phase of the membrane and ultimately released from the outlet of the membrane (right side of FIG. 1B). In contrast to the known mechanism of FIG. 1A, this transport is balanced via conduction of hydroxide and/or oxide ions in the opposite direction, which advantageously occurs within the molten hydroxide phase as opposed to the solid phase.

Accordingly, the presently disclosed inventive concepts avoid the rate-limiting and high temperature-dependent transport of oxide ions through a solid phase of the membrane, conferring significant advantages to separation of acidic gases such as carbon dioxide. The particular advantages and mechanisms will be described in further detail below, according to various exemplary embodiments.

In one approach, a molten hydroxide carbon dioxide separation membrane separates carbon dioxide from molecular nitrogen with a molten hydroxide electrolyte, such as molten mixtures of alkali metal hydroxides like potassium, sodium, cesium, rubidium, and/or lithium. The molten hydroxide system serves to conduct both carbonate and oxide in the liquid phase. The molten hydroxide advantageously absorbs and solvates large concentrations (e.g. up to 50 wt %) of carbon dioxide as carbonate. The molten hydroxide can also conduct oxide ions quickly through the liquid phase as hydroxide, hydronium, and/or protons (H+).

The conduction of hydroxide and protons may occur, and preferably occurs much more rapidly than conduction of carbonate across the membrane. As a result the separation process is rate limited by carbonate mass transport rather than the transport of oxide ions through a solid phase. Accordingly, the molten hydroxide membranes disclosed herein separate acidic gases approximately 100-10,000 times faster at a given temperature than the molten carbonate membranes because the separation rate is limited by the transport of carbonate in the liquid phase rather than by the rate of oxide transport through the solid phase.

For instance, as discussed further herein, in a range from approximately 350 to about 700 C, in various approaches, the $10^2$-$10^4$ fold separation rate improvement may be accomplished. As will be appreciated by persons having ordinary skill in the art upon reading the present disclosure, at higher temperature ranges even higher separation rates may be achieved.

A difference in partial pressure of CO2 between the feed and permeate sides of the membrane is advantageous to transport dissolved CO2 across the membrane, A pressure gradient between the feed and permeate side, and/or utilizing a sweep gas on the permeate side to lower CO2 partial pressure may be utilized to facilitate transport of gases through the membrane in the context of the present disclosures.

The hydroxide melts are relatively viscous, yet exhibit exceptionally high ionic conductivities for ionic species such as carbonate, nitrate and sulfate, which can be transported quickly through the melt. The partial pressure across the membrane is a driving force for net movement of carbon dioxide and other acid gases through the membrane. The rate at which the gases move across the membrane are a function of solubility, diffusion coefficients, membrane thickness, concentration of water vapor, and partial pressure gradient. The solubility and diffusion coefficients are predominantly controlled by gas temperature and composition of the molten electrolyte. The membrane thickness is preferably minimized to facilitate rapid mass transport without sacrificing structural integrity required to support the membrane under the pressure gradient.

In various embodiments, and consistent with operational conditions of environments such as flues of combustion power plants, the pressure gradient to which the membrane may be exposed, and thus must withstand, is in a range from approximately 0-20 atmospheres for transporting the gases across the membrane.

As will be understood by persons having ordinary skill in the art upon reading the present disclosures, a high pressure gradient could disadvantageously pull the hydroxide melt through and out of the support matrix. This is one reason why using a sweep gas such as steam is advantageous, in various embodiments and as described in further detail below. In particular, using a sweep gas may advantageously push the equilibrium shown in equation 2 to the left and lower the partial pressure contribution of species to be removed from the gas mixture (on the permeate side).

Accordingly, the presently disclosed inventive separation membranes are designed to retain the molten hydroxide phase within a solid support based on capillary action. As such, the support structure is preferably a porous matrix such as an aerogel, and even more preferably is characterized by pores having a diameter in a range from approximately 75 nm to about several (e.g. 10) microns. As will be understood by persons having ordinary skill in the art upon reading the present descriptions, larger pore size is desirable to facilitate rapid mass transport through the membrane, but pores must be sufficiently small to retain the molten hydroxide phase within the matrix when subjected to the pressure gradient generated within the separation environment.

In some embodiments, it is advantageous to include use a membrane with varying pore size throughout the cross-section, e.g. a gradient in pore size. For example large pores may be included in a region proximate to the inlet of the membrane, and may gradually become smaller toward an outlet of the separation membrane. Such embodiments allow thick membranes that have the required mechanical strength without sacrificing transport or liquid retention. In alternative approaches, the gradient may be configured such that pores having a smallest average diameter are located in a central region of the separation membrane (measured according to a direction along which ions migrate through the membrane) with larger pores located in proximity to each outer face of the membrane.

In several experiments, it has been determined that a pressure on the order of 20 atmospheres or more is required to overcome capillary action to remove water from a 200 nm $SiO_2$ pore. Accordingly, the presently disclosed inventive separation membranes are preferably characterized by pores with an average diameter of approximately 200 nm, in one approach. Since hydroxide exhibits strong electrostatic attraction, it is expected that larger average pore sizes may be feasible, advantageously facilitating increased mass transport across the separation membrane. For instance, in one embodiment pores with an average diameter of approximately 500 nm may be utilized without sacrificing structural integrity of the membrane under a pressure gradient of 5-20 atmospheres. Indeed, in some approaches, it is possible to separate CO2 with no pressure gradient at all, by driving the separation using a concentration gradient with respect to $CO_3^{2-}$ ions across the membrane. Alternatively, the reaction may be driven by use of a sweep gas to apply a pressure gradient of 0 atmospheres across the gradient, by effectively balancing pressure across the membrane.

Pores may have an average diameter in a range from about 10 nm to about 1 mm, from about 100 nm to about 100 um, from about 100 nm to about 10 um, from about 200 nm to about 5 um, or in a range from about 200 nm to about 1 um, in various embodiments. As will be appreciated by skilled artisans upon reading the present disclosures, the pore size is critical to retention of hydroxide in pores of the porous support structure under a given pressure gradient.

Accordingly, pore size should be controlled according to the stress to which the separation membrane will be subjected in operation for the particular application in which the membrane will be employed. As will be further appreciated by skilled artisans upon reading these disclosures, therefore the pore size may be determined based on operating conditions (particularly temperature and pressure) under which the membrane will be used and mechanical and/or electrostatic properties of the materials from which the membrane is formed.

For example, in one embodiment porous materials based on $ZrO_2$ have been experimentally determined to retain 62 wt % KOH loading at 400 C over a duration of >48 hours. The heating, in one approach, includes incubation over a period of 192 hours, with four cycles of heating to 400 C and cooling to room temperature (e.g. 23-27 C). The pore size for this embodiment was determined to be in a range of approximately 0.1-0.5 um, and retention was accomplished under conditions that did not include application of a pressure gradient.

Without wishing to be bound to any particular theory, the inventors postulate this unexpected and superior retention is attributable to better-than-expected wettability of hydroxide in ceramic materials such as cerium oxide, zirconium oxide, silicon carbide, and equivalents thereof that would be appreciated by a person having ordinary skill in the art upon reading the present disclosures.

In more approaches, and preferable in some applications to reduce energy consumption associated with separation of offensive and/or acidic gases from gas mixtures such as flue gas, the presently disclosed inventive separation membranes and processes may accomplish separation without applying a pressure gradient via use of a sweep gas. For instance, in one embodiment water vapor may be passed across the permeate side of the membrane (opposite the side where offensive and/or acidic gases are present in high concentration, e.g. in the flue). Optionally, but advantageously, the sweep gas may apply pressure to the permeate side of the membrane.

Using a sweep gas is an attractive embodiment for several reasons. First, the water pushes the equation (2) equilibrium over to favor $CO_2$ release on the permeate side of the membrane. Second, $CO_2$ separates at a higher rate than without sweep gas utilization, because the sweeping action maintains a larger $CO_2$ gradient across the membrane than a vacuum, with less energy. Third, if the steam pressure applied to the permeate side of the membrane is approximately equal to the pressure applied to the membrane by the gas mixture (e.g. flue side), there is no difference in total pressure across the membrane, which significantly relaxes the materials challenges for capillary action (pore size) and mechanical strength. Fourth, steam is already present and available in various suitable applications, such as power plants (where steam is used in the heat exchanger), obviating the need to provide external sources of steam and further improving energy efficiency of separation. Fifth, water vapor can be easily separated from the $CO_2$ after gas separation (e.g. via condensation), which further allows advantageous harvesting of heat from the water vapor.

Figure 2A:
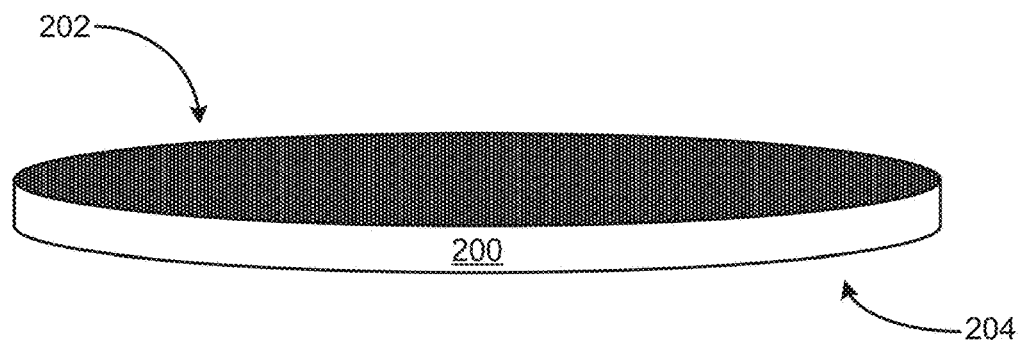
FIG. 2A is a simplified schematic of a separation membrane, according to one embodiment.

In one embodiment, an exemplary separation membrane 200 is shown according to a simplified schematic as represented in FIG. 2A. The separation membrane 200 includes a porous support structure with hydroxide disposed in the continuous pore system defined by the voids of the porous support. The separation membrane includes an inlet 202 and an outlet 204 through which acidic gases are transported via the hydroxide under operating conditions including an elevated temperature in a range from approximately 300-700 C and a pressure gradient across the membrane in a range from approximately 5-20 atmospheres. In other approaches, separation of oxide gases such as $CO_2$, $SO_4$, and/or $NO_3$ may be accomplished without the use of a pressure gradient, relying instead solely on a concentration gradient across the membrane to facilitate mass transport thereacross.

Figure 2B:
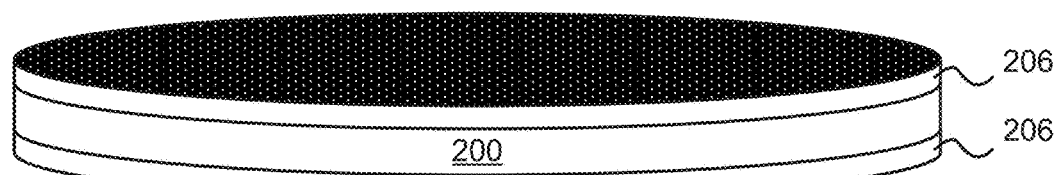
FIG. 2B depicts a simplified schematic of a separation membrane having formed thereon conductive electrodes, according to another embodiment.

In preferred approaches, the porous support structure comprises a system of continuous pores connecting the inlet 202 of the separation membrane to the outlet 204 of the separation membrane, thus enabling efficient mass transport thereacross. The separation membrane 200 may be formed in any suitable configuration, and preferably is characterized by dimensions and a shape suitable to fit within an existing structure of the emissions source (e.g. within a heat exchanger of a power plant, cement factory, etc.) and separate a high-pressure, acidic gas-rich environment from a low-pressure, acidic gas-poor environment (e.g. a capture facility, tank, line, etc.), While the configuration shown in FIGS. 2A-2B is characterized by a circular configuration, other shapes may be implemented without departing from the scope of the present disclosures. In various experimental embodiments, the support structure may be formed and have a cross sectional area on the order of 100 $cm^2$, e.g. a 10 cm×10 cm square.

Preferably, the support structure is characterized by a surface area in a range from approximately 50 $m^2$ to approximately 1000 $m^2$ in order to maximize mass transport through the continuous pore system thereof. As described in further detail below, surface area may be reduced while achieving equivalent separation via application of electric potential, e.g. an alternating current, across the separation membrane 200. In theory, complete carbon dioxide removal for a 400 megawatt power plant may be achieved using a surface area in a range from approximately 50 $m^2$ to approximately 1000 $m^2$ even without the application of electric current, and may be accomplished with even lower surface area structures by investing electrical energy on the order of 1-2% of the power plant's total production to facilitate mass transport.

In addition, the separation membrane 200 is characterized by a thickness sufficient to withstand the pressure gradient, but minimally thick so as to facilitate rapid mass transport through the membrane. In one approach, a thickness of approximately 0.5 cm has been determined sufficient to accomplish rapid transport while withstanding 5-20 atmosphere pressure gradients.

In one embodiment, enhancing mass transport of the dissolved acid gas species across the membrane may be accomplished by using an alternating current (AC) wave. Accordingly, and as shown in FIG. 2B, several embodiments of the presently disclosed inventive separation membrane 200 may have a porous, conductive membrane 206 coupled to the inlet and/or outlet of the separation membrane 200. The conductive membrane may include a material such as graphene, activated carbon, or other conductive material as disclosed herein and would be understood as suitable by a person having ordinary skill in the art upon reading the present disclosures for the purpose of serving as an electrode.

Mass transport of the dissolved acid gases across the membrane can be enhanced by causing migration in addition to diffusion because dissolved species such as carbonate, nitrate, and sulfate ($CO_3^{2-}$, $NO^{3-}$, $SO_4^{2-}$) are charged. Ions migrate in response to applied current/voltage. Since potassium hydroxide/sodium hydroxide melts have exceptionally high ionic conductivities (e.g. 1 S/cm at 300 C), an alternating current (AC) can quickly and efficiently migrate the dissolved acid gas species from high to low concentration. The application of an AC signal increases both the rate and selectivity of acid gas separation from non-acid gases because the latter will not ionize in the molten electrolyte. Accordingly, conductive coatings may serve as electrodes for application of the AC signal, and may be formed by coating each side of the membrane with activated carbon (or other graphitic material) which is preferably stable, conductive, and permeable to gases.

In various embodiments, the support structure may comprise an aerogel formed of materials selected from inconel 600, grade 316 stainless steel, an alkaline earth oxide, yttrium doped zirconium oxide, cerium oxide, magnesium oxide, aluminum oxide, calcium carbonate and silicon carbide. Any other equivalent material that would be appreciated by a skilled artisan upon reading the present disclosures may also be utilized without departing from the scope of the invention described herein. The support material should be capable of withstanding high pH environments characteristic to molten hydroxides, high operating temperatures of a flue or other similar environment (e.g. 300-700 C), withstand oxidation by the residual $O_2$ in the flue gas, and be robust to water vapor and at such temperatures. In addition, the support material is ideally characterized by being highly wettable by the molten hydroxide phase.

Figure 3:
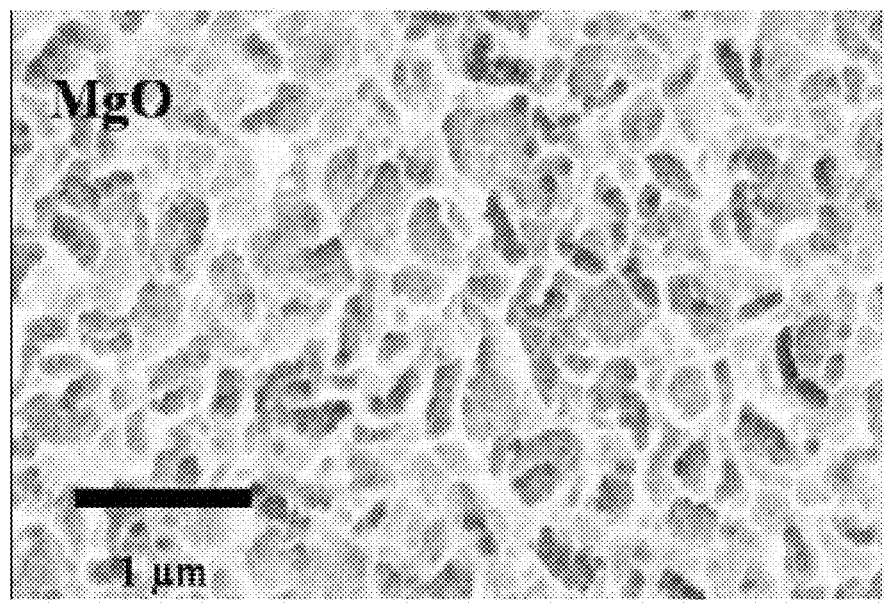
FIG. 3 is an image of a porous magnesium oxide support structure, according to one embodiment.

FIG. 3 depicts an exemplary embodiment of such a support structure comprising a porous magnesium oxide aerogel. The support structure may be formed using any suitable technique known in the art, in various approaches. For instance, in one approach fabrication of a porous magnesium oxide aerogel may be accomplished substantially as disclosed by Li, et al. in a publication entitled "Hard-templating pathway to create porous magnesium oxide," *Chemistry of Materials* 16:5676-81 (2004).

In more embodiments, the support structure may comprise other materials as disclosed herein, and may be formulated using a modified version of the procedures disclosed by Li, et al., and/or may involve the use of additive manufacturing and/or three-dimensional (3D) printing techniques. For instance, several embodiments may form the presently disclosed inventive structures via the use of a templating process in combination with known 3D printing techniques, as would be understood by a person having ordinary skill in the art upon reading the instant descriptions.

Faster movement of acid gases across the membrane desirably minimizes infrastructure quantity and cost of the overall separation process/solution. In preferred approaches, a mixture of molten hydroxide (e.g. approximately equimolar amounts of NaOH/KOH/LiOH, or amounts in a range as described by the ratios provided below, in various embodiments) provides an exceptionally ionic conductivity of 1 S/cm at 300 C even though the viscosity thereof is in a range of approximately 2-3 centipoise. In another embodiment, the eutectic mixture may include alkali metal hydroxides according to a ratio of 4KOH:4NaOH:1LiOH. In another embodiment, the mixture may include alkali metal hydroxides according to a ratio of 1KOH:1NaOH:4LiOH.

Applying an AC wave advantageously enhances mass transport with migration because the acid gases are ionic ($CO_3^{2-}$, $NO^{3-}$, $SO_4^{2-}$) when dissolved in the hydroxide melt. The melt's exceptionally high ionic conductivity means an AC wave can quickly and efficiently migrate the dissolved gases from high to low concentration sides of the membrane, thus improving the efficiency of the separation process.

Accordingly, various embodiments of the presently disclosed inventive concepts will include mixtures of hydroxides as disclosed herein having a ratio in a range of 4:1:1 to 1:1:4, where each component is selected from the exemplary hydroxides disclosed herein. Preferred embodiments include ternary mixtures of KOH, NaOH, and LiOH, with mixtures including higher lithium concentrations being particularly preferred. In several embodiments, the mixture may be characterized as eutectic, i.e. comprising a homogenous solid mixture of atomic and/or chemical species forming a joint super-lattice such that each pure component has a distinct bulk lattice arrangement. The eutectic mixture, as described herein, melts as a whole (as opposed to individual components melting individually under different conditions such as temperature and pressure) at the lowest possible melting temperature over all possible mixing ratios for the involved atomic/chemical species.

Molten hydroxide eutectics can melt as low as 150-170 C. and so the membrane is operational at even lower temperatures than 300-700 C and pressures of 5-20 ATM in embodiments featuring the eutectic mixture or similar composition. In such embodiments, the molten hydroxide will adsorb $CO_2$ upon exposure to the gas mixture (e.g. flue gas) and eventually reach a steady state carbonate concentration during the separation process. The molten separation phase can then be described as having an average concentration of KOH, NaOH, LiOH, $K_2CO_3$, $Na_2CO_3$, and/or $Li_2CO_3$, depending on the particular hydroxide species included in the mixture. The molten separation phase will not completely convert from hydroxide species to carbonate species because the separation process will cease in the absence oxide and hydroxide conduction in the liquid phase. The molten electrolyte therefore preferably maintains a significant average concentration of >approximately 5 mol % hydroxide during continuous operation.

Of course, the eutectic mixtures are also operational at temperatures and pressures existing in the flue gas at a region prior to the power plant's heat exchanger. Advantageously, at this point the carbon dioxide is sufficiently energetic to drive the separation process without addition of energy from outside sources, eliminating the need to cannibalize energy from the power plant or other emission source.

The molten hydroxide separation phase is highly selective for carbon dioxide and other acid gases such as sulfates and oxides of nitrogen ($SO_2$ and $NO_x$), which also would be separated in ideal circumstances, but which undesirably usually foul other membrane systems. Since carbon decomposes in contact with molten hydroxide in the envisioned temperature range of 300-700 C and the 2-5% residual $O_2$ found in flue gas, the presently disclosed systems can advantageously self-clean, thus avoiding the fouling experienced when using solid-phase polymer-based separation membranes.

The molten hydroxide system disclosed herein is the fastest ion conductor developed to-date, and is characterized by a separation rate in a range from approximately $1\times10^{-6}$ to $1\times10^{-4}$ mol $s^{-1}$ $cm^{-2}$ when operating in a 250-700 C temperature range. Furthermore, the molten hydroxides and the solid support structure provide superior electrochemical, thermal, and hydrothermal stability than any system utilizing organic or transition on metal oxide components. The presently disclosed inventive systems are therefore superior due to a combination of 1) high separation rates; 2) operability at appropriate temperatures; 3) high selectivity for acidic gases; 4) low energy costs; 5) low infrastructure costs; and 6) high stability/durability of the separation membrane under operational conditions.

Figure 4:
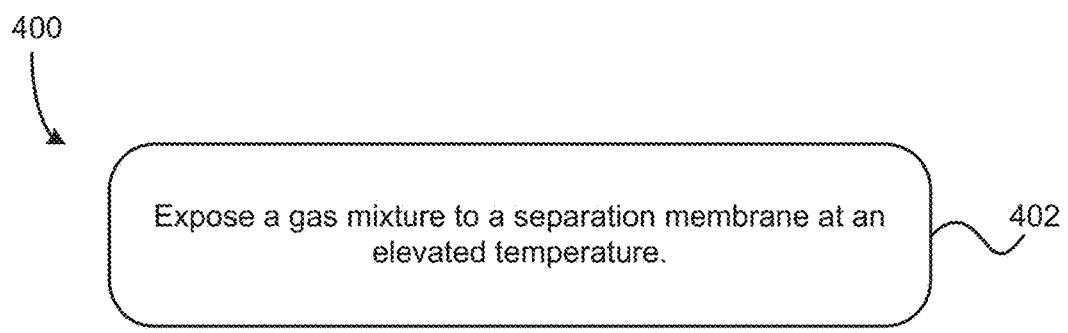
FIG. 4 is a flowchart of a method for separating acidic gases from emissions, according to various embodiments.

Accordingly, in one embodiment, a process for separating acidic gases such as oxides of carbon, nitrogen and/or sulfur from emissions may proceed substantially as shown in FIG. 4 and according to method 400. The method 400 may be performed in any suitable environment, such as a power plant, cement factory, or other suitable emissions source including a separation membrane as shown in FIGS. 2A-2B, or other environments suitable for the particular type of gas separation, and as would be understood by a person having ordinary skill in the art upon reading the present descriptions.

Method 400 includes operation 402, in which a gas mixture is exposed to a separation membrane at an elevated temperature (and optionally at elevated pressure). The separation membrane preferably comprises a porous support and at least one molten alkali metal hydroxide disposed within pores of the porous support, as described hereinabove according to various embodiments. In some approaches, the optional elevated pressure may cause a pressure gradient across the separation membrane, which may further optionally be balanced by applying a sweep gas to one side of the membrane.

Of course, as will be understood by persons having ordinary skill in the art upon reading the present descriptions, method 400 may additionally and/or alternatively include any suitable materials, features or operations as described herein.

Accordingly, method 400 may include reversibly solvating the acidic gases in the at least one molten alkali metal hydroxide at an inlet of the separation membrane, and releasing solvated ions from an outlet of the separation membrane, the solvated ions being anionic forms of the acidic gases.

Optionally, applying a potential across the separation membrane may facilitate selectivity and permeance of the membrane to the acidic gases, in one approach. Accordingly, the method 400 may include applying an alternating current (A/C) across the separation membrane.

The operational pressure to which the membrane is exposed is preferably in a range from about 0.25 atmosphere to about 20 atmospheres, and more preferably in a range from about 5 atmospheres to about 20 atmospheres.

Alternatively, the total pressure gradient across the membrane could be as low as 0 atmospheres if a sweep gas is used, which is a preferred approach in sonic embodiments to minimize energetic cost of separating the offensive and/or acidic gases, since applying a vacuum or pressure gradient across the membrane may be relatively energy intensive in some applications. Accordingly, in various approaches applying a pressure gradient across the separation membrane may actually involve equalizing pressure across the gradient, causing an existing pressure gradient magnitude to drop to zero magnitude. As such, as discussed herein "applying a pressure gradient" should be understood to include embodiments where an existing pressure gradient across the membrane is reduced, potentially to zero magnitude, e.g. by applying a sweep gas to one side of the membrane.

The elevated temperature is in a range from about 200 C to about 700 C, more preferably in a range from about 350 C to about 500 C, in various embodiments.

The acidic gases preferably include one or more gases having a formula of: $CO_x$, $NO_y$, and $SO_z$, where x is a value in a range from 1-2, y is a value in a range from 1-3, and z is a value in a range from 1-4.

Applications/Uses

Embodiments of the present invention may be used in a wide variety of applications, particularly for separation of carbon dioxide from flue gases of fossil fuel power plants, vehicular gas emissions, or any other suitable source of greenhouse gases that would be understood by a person having ordinary skill in the art upon reading the present disclosure.

In addition, the presently disclosed inventive separation membranes and techniques of use thereof may be employed in other systems and applications relying on separation, such as fuel cell technology, fuel synthesis, etc. as would be understood by persons having ordinary skill in the art upon reading the present disclosures.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof.

In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A separation membrane, comprising:
a porous support structure, wherein the porous support structure is configured to retain at least one alkali metal hydroxide in a molten phase within pores of the porous support structure based on capillary action; and
at least one alkali metal hydroxide disposed within pores of the porous support structure.

2. The separation membrane as recited in claim 1, wherein the at least one alkali metal hydroxide is selected from a group consisting of lithium hydroxide, sodium hydroxide, potassium hydroxide, rubidium hydroxide, and cesium hydroxide.

3. The separation membrane as recited in claim 1, comprising a mixture of at least two alkali metal hydroxides selected from a group consisting of: lithium hydroxide, sodium hydroxide and potassium hydroxide.

4. The separation membrane as recited in claim 1, wherein the porous support structure is characterized by at least one gradient in pore size along an axis of the porous support structure.

5. The separation membrane as recited in claim 1, wherein the porous support structure comprises a material selected from a group consisting of: inconel 600, grade 316 stainless steel, grade 304 stainless steel, an alkaline earth oxide, yttrium doped zirconium oxide, cerium oxide, calcium carbonate and silicon carbide.

6. The separation membrane as recited in claim 1, wherein the at least one alkali metal hydroxide is present in a molten phase.

7. The separation membrane as recited in claim 1, wherein pores of the porous support structure are characterized by a diameter in a range from about 75 nm to about 1 millimeter.

8. The separation membrane as recited in claim 1, comprising a porous conductive coating coupled to opposite ends of the separation membrane.

9. The separation membrane as recited in claim 1, wherein the porous support structure is characterized by a cross-sectional area of at least 1 cm$^2$ and a thickness of at least 0.01 cm.

10. The separation membrane as recited in claim 1, wherein the porous support structure comprises an aerogel comprising at least one material selected from the group consisting of: inconel 600, grade 316 stainless steel, an alkaline earth oxide, yttrium doped zirconium oxide, cerium oxide, magnesium oxide, aluminum oxide, calcium carbonate, silicon carbide, and combinations thereof.

11. A method for separating acidic gases from a gas mixture, the method comprising:
   exposing the gas mixture to a separation membrane at an elevated temperature, wherein the separation membrane comprises:
      a porous support structure, wherein the porous support structure is configured to retain at least one alkali metal hydroxide in a molten phase within pores of the porous support structure based on capillary action; and
      at least one alkali metal hydroxide disposed within pores of the porous support structure.

12. The separation membrane as recited in claim 1, wherein the at least one alkali metal hydroxide comprises a eutectic mixture of the alkali metal hydroxides.

13. The separation membrane as recited in claim 1, wherein the at least one alkali metal hydroxide comprises an equimolar mixture of potassium hydroxide, sodium hydroxide, and lithium hydroxide.

14. The separation membrane as recited in claim 1, wherein the at least one alkali metal hydroxide comprises a ternary mixture of potassium hydroxide, sodium hydroxide, and lithium hydroxide.

15. The separation membrane as recited in claim 14, wherein the potassium hydroxide and the sodium hydroxide are each present in an amount less than the lithium hydroxide.

16. The separation membrane as recited in claim 14, wherein the potassium hydroxide, the sodium hydroxide, and the lithium hydroxide are present in a ratio in a range from 4:1:1 to 1:1:4.

17. The separation membrane as recited in claim 1, wherein the at least one alkali metal hydroxide comprises a ternary mixture of hydroxides present in a ratio in a range from 4:1:1 to 1:1:4.

18. The separation membrane as recited in claim 4, wherein the size gradient is characterized by either:
   a first profile in which larger of the pores are located near a first end of the porous support structure and smaller of the pores are located near a second end of the porous support structure, wherein the first and second ends of the porous support structure are positioned opposite one another; or
   a second profile in which larger of the pores are located near the first and second ends of the porous support structure and smaller of the pores are located a central region between the first and second ends of the porous support structure.

19. The separation membrane as recited in claim 8, wherein the conductive coating comprises activated carbon and/or a graphitic material.

* * * * *